US00RE38617E1

(19) United States
(12) Reissued Patent
Saito et al.

(10) Patent Number: US RE38,617 E
(45) Date of Reissued Patent: Oct. 12, 2004

(54) METHOD OF INJECTION MOLDING PLASTIC LENS

(75) Inventors: Kiyohiro Saito, Tokyo (JP); Hiroshi Asami, Tokyo (JP)

(73) Assignee: Hoya Corporation, Tokyo (JP)

(21) Appl. No.: 09/985,910

(22) PCT Filed: Mar. 18, 1997

(86) PCT No.: PCT/JP97/00874

§ 371 (c)(1),
(2), (4) Date: Apr. 14, 1999

(87) PCT Pub. No.: WO98/41379

PCT Pub. Date: Sep. 24, 1998

Related U.S. Patent Documents

Reissue of:
(64) Patent No.: 6,156,242
Issued: Dec. 5, 2000
Appl. No.: 09/284,444
Filed: Apr. 14, 1999

(51) Int. Cl.[7] ..... B29D 11/00
(52) U.S. Cl. ..... 264/2.2; 264/2.5; 264/40.6
(58) Field of Search ..... 264/1.1, 2.2, 2.3, 264/2.5, 2.7, 40.6; 425/808

(56) References Cited

U.S. PATENT DOCUMENTS 4,184,835 A * 1/1980 Talbot
4,364,878 A * 12/1982 Laliberte et al.
4,778,632 A * 10/1988 Bakalar ..... 264/2.2
4,828,769 A * 5/1989 Maus et al.
4,836,960 A 6/1989 Spector et al.
4,900,242 A * 2/1990 Maus et al.
5,376,317 A * 12/1994 Maus et al. ..... 264/40.6
5,604,549 A 2/1997 Mashige et al.

FOREIGN PATENT DOCUMENTS

EP 0 244 783 B1 * 11/1987
EP 0 279 972 A * 8/1988

(List continued on next page.)

OTHER PUBLICATIONS

Sandwich Press Injection, Engel Information.*
Letter addressed to Dr. Walter Maiwald, dated Nov. 10, 1997, re: Challenge to Hoya EPO 0 778 118 A1 and EPO 0 778 119 A1, pp. 1–7.*
Letter addressed to Hiroshi Yukawa, dated Nov. 26, 1997, re: Reasons for GMV's Cancellation of Hoya P.O. and Refund, pp. 1–7.*
Galic, George et al., "Improved Plastic Molding Technology for Ophthalmic Lens and Contact Lens," Reprinted from Ophthalmic Lens Design and Fabrication, vol. 1529, 1992, pp. 13–21.*
Galic, George, "Injection–Compression Moulding of Rx Polycarbonate Lenses: Market Growth and Product Characteristics," Optical World, pp. 30–33.*

*Primary Examiner*—Mathieu D. Vargot
(74) *Attorney, Agent, or Firm*—Oliff & Berridge, PLC

(57) ABSTRACT

A cavity 22 in an injection molding assembly includes a lower mold insert 21 for shaping a lens convex surface and an upper mold insert 20 for shaping a lens concave surface. When the heated injection molding assembly is cooled and a lens is ejected after a molten resin is pressurized by the upper mold insert 20, the temperature of the lower mold insert 21 is lowered below the temperature of the upper mold insert 20, which prevents the molded lens from bending at a central portion and enable high transfer precision of insert shapes.

37 Claims, 9 Drawing Sheets

FOREIGN PATENT DOCUMENTS

| | | | |
|---|---|---|---|
| EP | 0 339 642 A | * | 11/1989 |
| EP | 0 765 734 A | * | 4/1997 |
| GB | 1 448 511 A | * | 9/1976 |
| JP | 54-148055 | * | 11/1979 |
| JP | 59-232835 | * | 12/1984 |
| JP | 60-212317 | * | 10/1985 |
| JP | 61-19327 | * | 1/1986 |
| JP | 61-66623 | * | 4/1986 |
| JP | 61-182918 | * | 8/1986 |
| JP | 62-23723 | * | 1/1987 |
| JP | 62-237323 | * | 1/1987 |
| JP | 62-60622 | * | 3/1987 |
| JP | 62-60623 | * | 3/1987 |
| JP | 1-146718 | * | 6/1989 |
| JP | 1-275111 | * | 11/1989 |
| JP | 1-291915 | * | 11/1989 |
| JP | 2-164516 | * | 6/1990 |
| JP | 6-31785 | * | 2/1994 |

* cited by examiner

METHOD OF INJECTION MOLDING PLASTIC LENS

Matter enclosed in heavy brackets [ ] appears in the original patent but forms no part of this reissue specification; matter printed in italics indicates the additions made by reissue.

TECHNICAL FIELD

The present invention relates to a method of injection molding a plastic lens and, more particularly, to temperature control of an injection molding assembly for making a highly precise lens molded in a cavity.

BACKGROUND ART

An injection molding technology to mold a meniscus-shaped plastic spectacle lens is shown in Japanese Patent Publication No. Hei 5-30608. In this technology, a cavity for molding the lens is formed inside an injection molding assembly, the cavity containing a pair of cavity forming members for shaping a convex surface and a concave surface of the lens disposed vertically opposite with each other. The injection molding assembly is heated before filling a molten resin in the cavity and one cavity forming member is moved toward the other cavity forming member to pressurize the molten resin filled in the cavity. Subsequently, the injection molding assembly is cooled to cool and solidify the molten resin, and the molded lens is taken out (=eject).

It is shown in Japanese Patent Laid-open No. Hei 6-31785 that an injection molding assembly is heated by means of a heating fluid such as steam and cooled by means of a cooling fluid such as air, water. In addition, after a molten resin is filled in a cavity in the injection molding assembly of which the temperature is raised beyond flow halting temperature of the molten resin, the temperature of the injection molding assembly is lowered below a glass transition point for molding a lens by cooling and solidifying the molten resin.

A lens is a precise molded product which requires high molding precision. Especially in a meniscus lens used for a spectacle lens, it is important that a convex shape and a concave shape of a pair of cavity forming members for shaping a convex surface and a concave surface of the lens are precisely transferred to the lens. However, when a lens to be molded has a difference in thickness between a central portion and a peripheral portion thereof, a thickness of the central portion being [larger] *less* than that of the peripheral portion, the lens is easy to bend at the thin central [potion] *portion*. When such a disadvantage occurs, a high-precision lens to which a convex shape and a concave shape of cavity forming members are accurately transferred is not obtained.

For manufacturing a high-precision lens, it is important to prevent heat distortion or shrinkage deformation from occurring, which requires that the entire molten resin filled in the cavity is uniformly cooled. However, since the amount of the molten resin filled in the cavity corresponds to the volume of the lens and differs depending on a type of the lens, especially lens power, uniform cooling is difficult by controlling the temperature uniformly. Thus, temperature control of an injection molding assembly is desired for molding each lens highly precisely irrespective of the above difference.

An object of the present invention is to provide a plastic lens injection molding method to mold a high-precision lens by means of proper temperature control of an injection molding assembly.

DISCLOSURE OF THE INVENTION

A method of injection molding a plastic lens according to the present invention provides a cavity for molding the lens formed by a pair of cavity forming members disposed opposite with each other inside an injection molding assembly for shaping a convex surface and a corresponding concave surface of the lens. The injection molding assembly is heated before filling a molten resin in the cavity and pressurizing the molten resin. Thereafter, the injection molding assembly is cooled to cool and solidify the molten resin for molding the lens in the cavity, before ejecting from the cavity. In the aforementioned method of injection molding the plastic lens, the temperature of the cavity forming member for shaping the lens convex surface is lowered below the temperature of the cavity forming member for shaping the lens concave surface in ejecting the lens.

According to the above injection molding method, when the lens is ejected, the temperature of the lens convex surface is lower than that of the lens concave surface, that is, the lens convex surface is cooled and solidified earlier from the lens concave surface, which prevents the lens from bending at a central portion thereof. Consequently, a high-precision lens can be obtained, where shapes of the convex surface and the corresponding concave surface of a pair of the cavity forming members are precisely transferred.

The aforementioned injection molding method is used for molding a meniscus lens, especially more effective in molding a lens having larger thickness of a peripheral portion than the thickness of a central portion (a minus lens).

When the minus lens is molded, it is preferable that the difference in temperature between the cavity forming member for shaping the lens convex surface and the cavity forming member for shaping the lens concave surface is enlarged in proportion to increase in the power (meaning spherical vertex refractive power and/or cylindrical refractive power in the present invention) of the lens molded in the cavity. Usually, as the lens power increases, the thickness of a peripheral portion becomes larger than that of a central portion, that is, a difference in thickness is enlarged, which causes the lens to bend easily at the central portion. However, the central portion of the lens is prevented from being bent even in a minus lens having large thickness difference by enlarging the temperature difference between the cavity forming member for shaping the lens convex portion and cavity forming member for shaping the lens concave portion in proportion to the increase in the lens power.

Time to cool the injection molding assembly after pressurization of the molten resin is preferably lengthened in proportion to the increase in the lens power in order to mold each of highly precise lenses having different power. As the lens power increases, the volume of the lens, that is, the amount of the molten resin filled in cavity increases. Therefore, the whole molten resin in the cavity can be gradually cooled uniformly to a predetermined temperature by lengthening a cooling time in proportion to the increase of the lens power. Consequently, each of lenses with different powers can be molded highly precisely with little heat distortion, little shrinkage deformation and the like.

In order to lower the temperature of the cavity forming member for shaping the lens convex surface below the temperature of the cavity forming member for shaping the lens concave surface, but the temperatures of the two cavity forming members may be the same or almost the same over the majority of the cooling time after pressurization of the molten resin. However, in order to securely lower the temperature of the lens convex surface below the temperature of the lens concave surface in ejecting, it is preferable that the cooling time of the injection molding assembly is controlled while differentiating the temperature of the cavity forming member for shaping the lens concave portion and the cavity forming member for shaping the lens convex portion by controlling flow rate of the temperature controlling fluid circulating in the injection molding assembly for raising and lowering the temperature of the injection molding assembly, thereby lowering the temperature of the cavity forming member for shaping the lens convex surface below the temperature of the cavity forming member for shaping the lens concave surface.

In the above, a pair of the cavity forming members for shaping the convex surface and the concave surface of the lens may be opposed with each other vertically or horizontally. In other words, an injection molding machine in which the injection molding assembly is mounted can be vertically or horizontally structured.

The number of cavities provided in the injection molding assembly is optional. One or more than one cavity is available.

In the method of injection molding the plastic lens according to the present invention, the molten resin is filled in the cavity for molding the lens inside the heated injection molding assembly and pressurized. Subsequently, the injection molding assembly is cooled to cool and solidify the molten resin so as to mold the lens in the cavity before ejecting the lens from the cavity. The injection molding method is characterized in that the time to cool the injection molding assembly is lengthened in proportion to increase in the power of the lens molded in the cavity.

According to the aforementioned injection molding method, since the cooling time of the injection molding assembly is controlled in proportion to change in power, the entire molten resin can be uniformly cooled to the predetermined temperature, thereby manufacturing a high-precision lens with little heat distortion, little shrinkage deformation and the like.

The injection molding method is available for molding, a lens of which a thickness of a peripheral portion is smaller than that of a central portion (a plus lens), and a semi-finished lens as well as the aforementioned minus lens.

Moreover, the injection molding method is applicable not only for molding a meniscus lens but for molding other types of lenses.

When the lens is a spectacle lens, some spectacle lenses have the same lens power, and different astigmatic powers. In such spectacle lenses with the same power and different astigmatic powers, it is preferable that the cooling time of the injection molding assembly is lengthened in proportion to increase in the astigmatic power, since the amount and/or the shape of molten resin filled in the cavity change in accordance with the astigmatic power even when the surface area of cavities in the injection molding assembly have no substantial difference.

The injection molding assembly can be heated and cooled by means of an electric heater, air cooling and the like. However, if the injection molding assembly is heated and cooled by means of a temperature controlling fluid of which the temperature is controlled, more specifically a heating fluid and a cooling fluid, temperature control can be performed highly precisely and easily.

When the lens is a spectacle lens, it is preferable that the temperature of the injection molding assembly is controlled in accordance with temperature curve, at least two temperature curves being prepared for weak power and strong power for minus lens and at least one for the plus lens. In molding a semi-finished lens of which one surface is later processed, it is preferable that another temperature curve is further prepared and the temperature of the injection molding assembly is controlled in accordance with the temperature curve. Thus, at least three temperature curves of the injection molding assembly, that is, for a weak minus lens, a strong minus lens and a plus lens, or four temperature curves can be prepared when a temperature curve for a semi-finished lens is included, so that temperature control can be easily conducted.

When the minus lens and the plus lens are molded, it is preferable that time to cool the injection molding assembly after pressurization of the molten resin is set for respective groups divided by lens spherical power and lens astigmatic power. Especially in molding the minus lens, the cooling time is preferably set for respective groups divided on the basis of the sum of lens spherical power and lens astigmatic power.

BEST MODE FOR CARRYING OUT THE INVENTION

Figure 1:
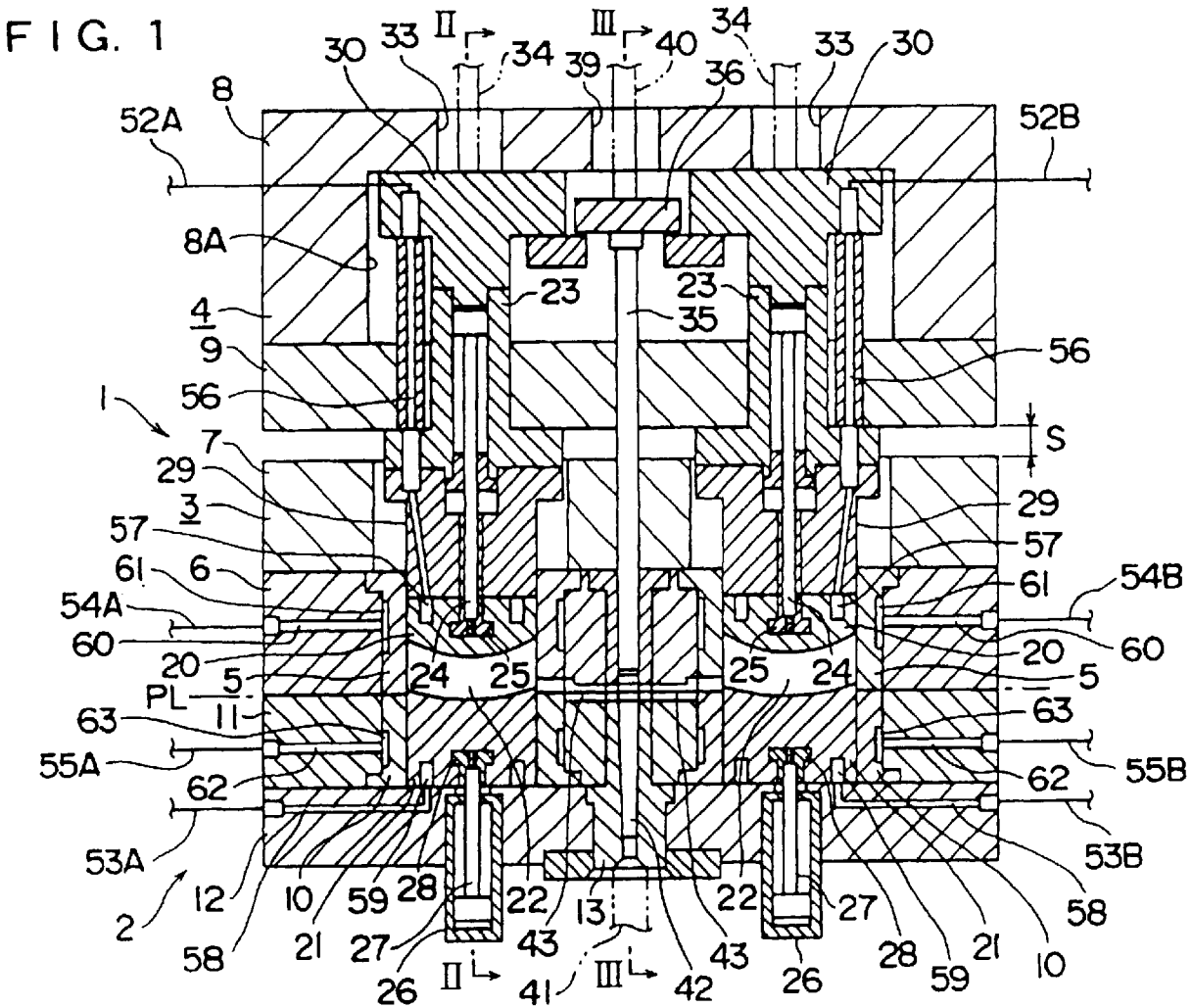
FIG. 1 is a vertical sectional view of an injection molding assembly used for implementing a molding method according to an embodiment of the present invention.
Figure 2:
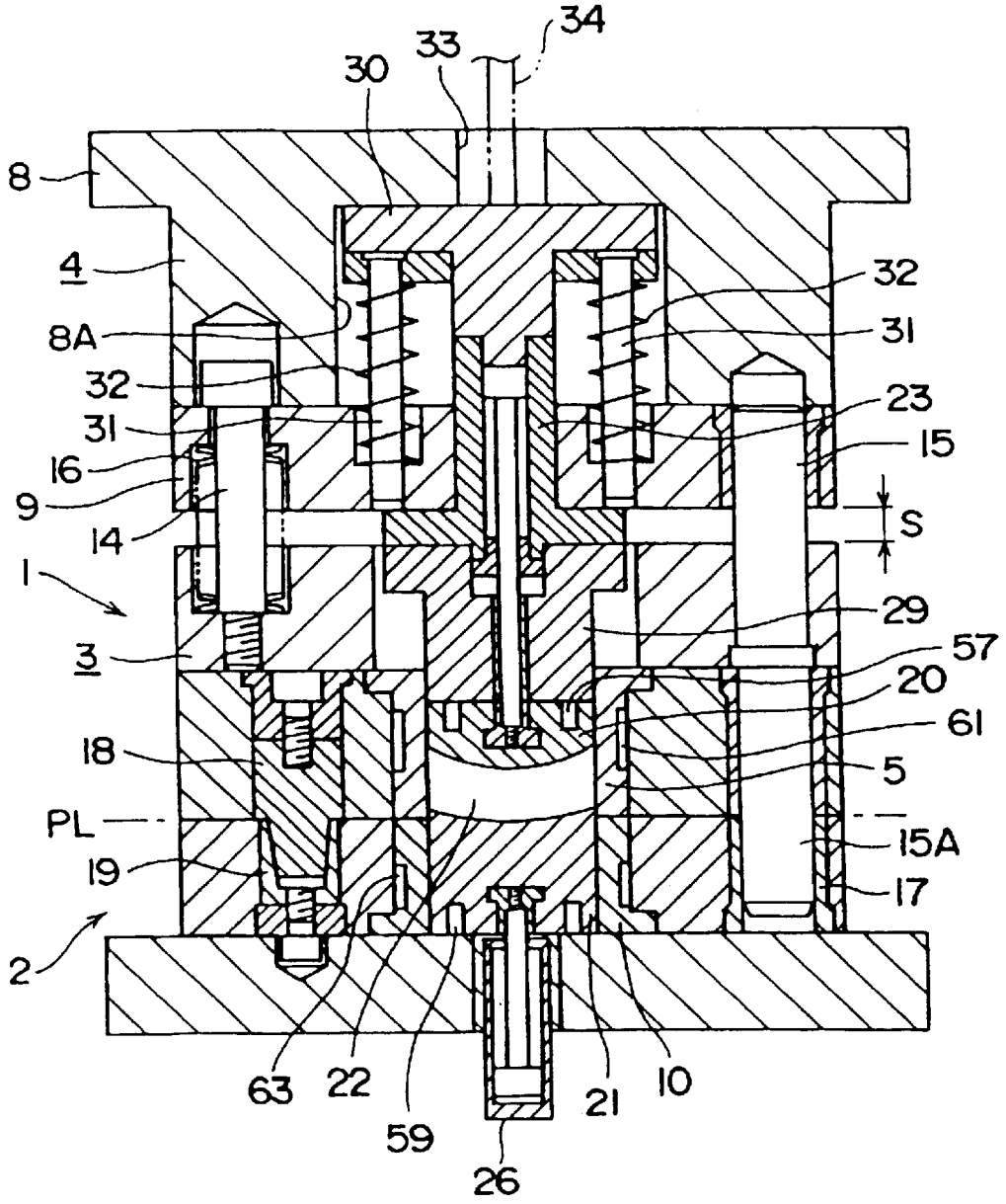
FIG. 2 is a sectional view taken along the II—II line FIG. 1.
Figure 3:
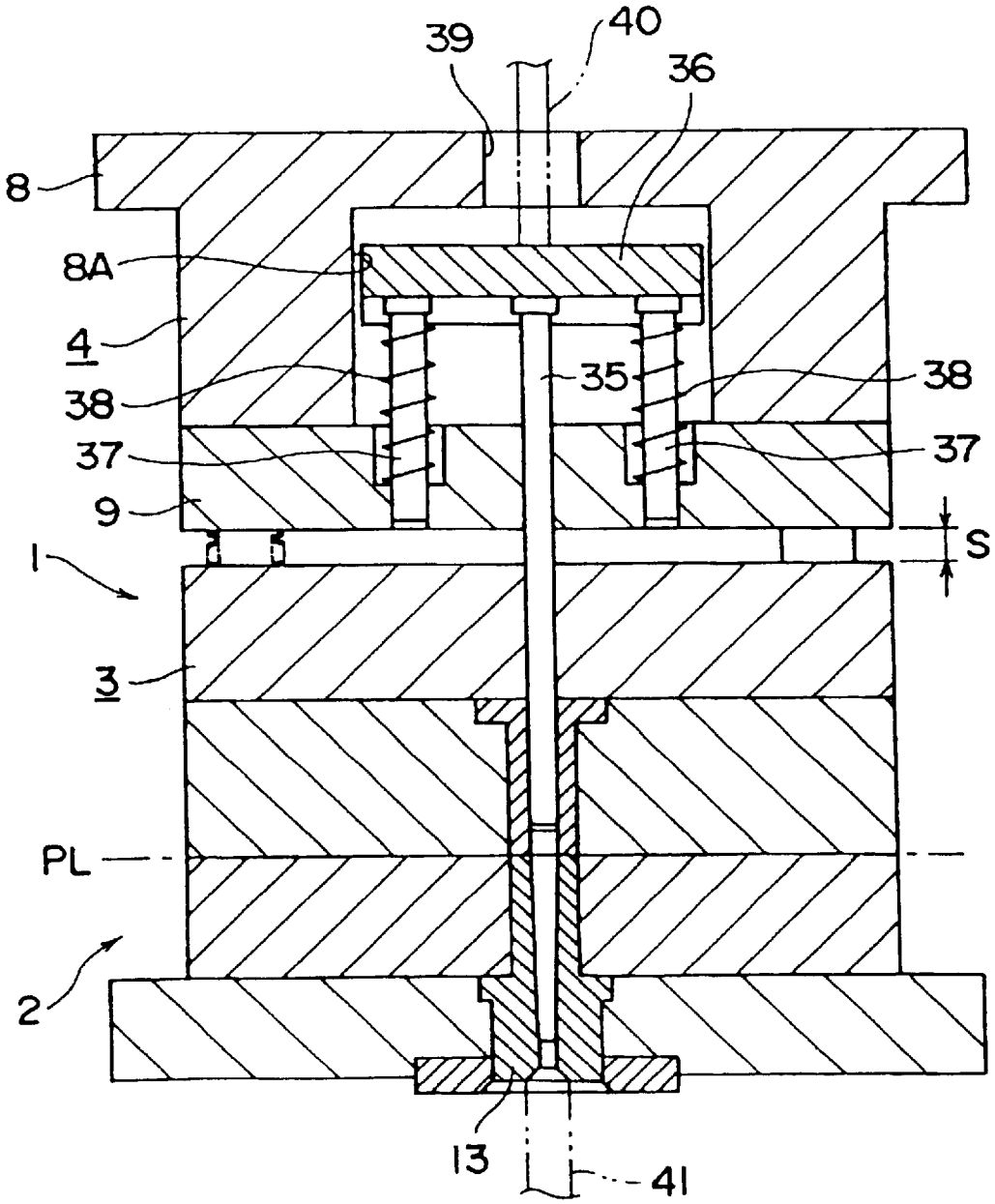
FIG. 3 is a sectional view taken along the III—III line FIG. 1.

An embodiment of the present invention will be described below with reference to the drawings. An injection molding method according to the present embodiment is for molding a meniscus lens for glasses. An injection molding assembly used for the injection molding method is shown in FIG. 1 to FIG. 3. FIG. 2 and FIG. 3 are sectional views taken along the II—II line and the III—III line in FIG. 1. The injection molding assembly can be formed of optional material such as glass and ceramic besides metal. Material for spectacle lenses as molded products is a thermoplastic resin such as PMMA (polymethyl methyacrylate), and PC (polycarbonate).

A structure of the injection molding assembly is hereunder described with reference to FIG. 1 to FIG. 3. The injection molding assembly is composed of an upper mold 1 and a lower mold 2. The upper mold 1 is a movable mold which opens and closes vertically in relation to the lower mold 2 as s fixed mold, and a parting line PL extends horizontally. The upper mold 1 is composed of a mold body 3 on a lower side and a die fitting member 4 in an upper side. The mold body 3 is provided with insert guides 5, mold plates 6 and 7 and the like. The die fitting member 4 is provided with an upper member 8 and a lower member 9 and the like. The lower mold 2 is composed of insert guides 10, mold plates 11 and 12, a sprue bush 13 and the like.

As clearly shown in FIG. 2, the mold body 3 of the upper mold 1 is mounted on the die fitting member 4 with a bolt 14. In this mounting, the mold body 3 is mounted being guided to the lower mold 2 by means of a guide rod 15 to be freely movable within a margin S. The margin S is opened between the mold body 3 and the die fitting member 4. The mold body 3 is always resiliently biased downward by means of a plate spring 16 attached on an outer periphery of the bolt 14.

A clamping cylinder (not shown) is provided above the die fitting member 4 which is mounted on the clamping cylinder. By the clamping cylinder the die fitting member 4 and the mold body 3 vertically move and the upper mold 1 composed of the mold body 3 and the die fitting member 4 vertically moves to open and close in relation to the lower mold 2. This vertical movement is conducted while an end portion 15A of the guide rod 15 in the upper mold 1 is inserted into and pulled out from a guide pipe 17 in the lower mold 2. The upper mold 1 and the lower mold 2 are aligned in closing the mold by a positioning pin 18 in the upper mold 1 being inserted in a positioning sleeve 19 in the lower mold 2.

A margin setting cylinder (not shown) is provided below the lower mold 2. When the mold body 3 in the upper mold 1 abuts on the lower mold 2 by the clamping cylinder and the die fitting member 4 is in close contact with the mold body 3, the die fitting member 4 is raised against clamping force of the clamping cylinder with the margin setting cylinder, thus opening the margin S between the mold body 3 and the die fitting member 4.

An upper mold insert 20 is put into the insert guide 5 mounted on the mold body 3 in the upper mold 1 movably in vertical direction. A lower mold insert 21 is put into the insert guide 10 provided in the lower mold 2 so as to be movably in vertical direction. By the aforementioned arrangement, a cavity 22 for molding a spectacle lens is formed. As shown in FIG. 1, two of the cavities 22 are provided on right and left sides in the present embodiment. Therefore, the injection molding assembly is used for molding two spectacle lenses simultaneously.

The upper mold insert 20 and the lower mold insert 21 form the cavity 22 with the insert guide 5 and 10, that is, the inserts 20 and 21 are cavity forming members. In the present embodiment, the upper mold insert 20 is a cavity forming member for shaping a concave surface of the lens and the lower mold insert 21 is a cavity forming member for shaping a convex surface of the lens.

Each of the upper mold inserts 20 is attached to a piston rod 24 of a hydraulic cylinder 23 disposed downward through a T-shaped clamping member 25, the hydraulic cylinder 23 being built in the die fitting member 4 in the upper mold 1 so as to be slideable vertically. Each of the lower mold inserts 21 is attached to a piston rod 27 of a hydraulic cylinder 26 disposed upward through a T-shaped clamping member 28, the hydraulic cylinder being fixed on the lower mold 2. A back insert 29, in which the piston rod 24 is inserted to be slideable vertically, is fixed on a lower surface of the hydraulic cylinder 23.

When the upper mold 1 is raised by means of the clamping cylinder and hence the upper mold 1 and the lower mold 2 are parted from the parting line PL, the upper mold insert 20 and the lower mold insert 21 are exposed between the upper mold 1 and the lower mold 2 by advancing the piston rods 24 and 27. T-shaped slots of the inserts 20 and 21, with which the T-shaped clamping members 25 and 28 are engaged, extend to an outer region of the inserts 20 and 21 for opening so that the inserts 20 and 21 are, respectively, inserted in and released from the piston rods 24 and 27, on which the T-shaped clamping members 25 and 28 are mounted, by engagement and disengagement of the T-shaped clamping members 25 and 28 with/from the T-shaped slots. Consequently, various inserts corresponding to spectacle lenses to be molded are exchangeably attached on the upper mold 1 and the lower mold 2. Meanwhile, when the piston rods 24 and 27 retract, the upper mod insert 20 and the lower mold insert 21 abut respectively on the back insert 29 and the mold plate 12 in the lower mold 2 to be seated, which makes the inserts 20 and 21 clamped.

A pressure receiving member 30 mounted on an upper surface of the hydraulic cylinder 23 is accommodated inside a recessed portion 8A of the upper member 8 composing the die fitting member 4 in the upper mold 1. As shown in FIG. 2, a pair of guide bars 31 slidably inserted in the lower member 9 of the die fitting member 4 are hung from the pressure receive member 30. By means of springs 32 attached on outer peripheries of the guide bars 31, the pressure receiving member 30, the hydraulic cylinder 23, and the back insert 29 are always resiliently biased upward oppositely to the lower mold 2 and the pressure receiving member 30 abuts on an upper surface of the recessed portion 8A formed downward in relation to the upper member 8 of the die fitting member 4.

A through-hole 33 leading to the recessed portion 8A is formed in the upper member 8 of the mold attaching member 4. An eject pin 34 is inserted in the through-hole 33 to move vertically by an eject cylinder (not shown). The eject pin 34 abuts on the pressure receiving member 30, and with descent of the eject pin 34 by means of the eject cylinder, the pressure receiving member 30, the hydraulic cylinder 23, the back insert 29, and the upper mold insert 20 are pressurized to move downward in relation to the upper mold 1.

As shown in FIG. 1, an eject bar 35 is inserted to be movable vertically in central parts of the mold body 3 of the upper mold 1 and the lower member 9 of the die fitting member 4. A pair of guide bars 37, vertically slidably inserted in the lower member 9, are fixedly hung from an pressure receiving member 36 mounted on an upper end of the eject bar 35 as shown in FIG. 3. By means of spring 38 attached on outer peripheries of the guide bars 37, a pressure receiving member 36 and the eject bar 35 are always resiliently biased upward. An eject pin 40, which is moved vertically with an eject cylinder (not shown), is inserted in a through-hole 39 formed in the upper member 8 of the die fitting member 4. With the eject pin 40, the pressure receiving member 36 and the eject bar 35 are pressurized to move downward.

As shown in FIG. 1, an injection nozzle 41 in an injection molding machine is connected to the sprue bush 13. A runner 43 is connected to an upper end of a sprue 42 in the sprue bush 13, the runner 43 extending to the cavities 22 provided on right and left side.

Figure 4:
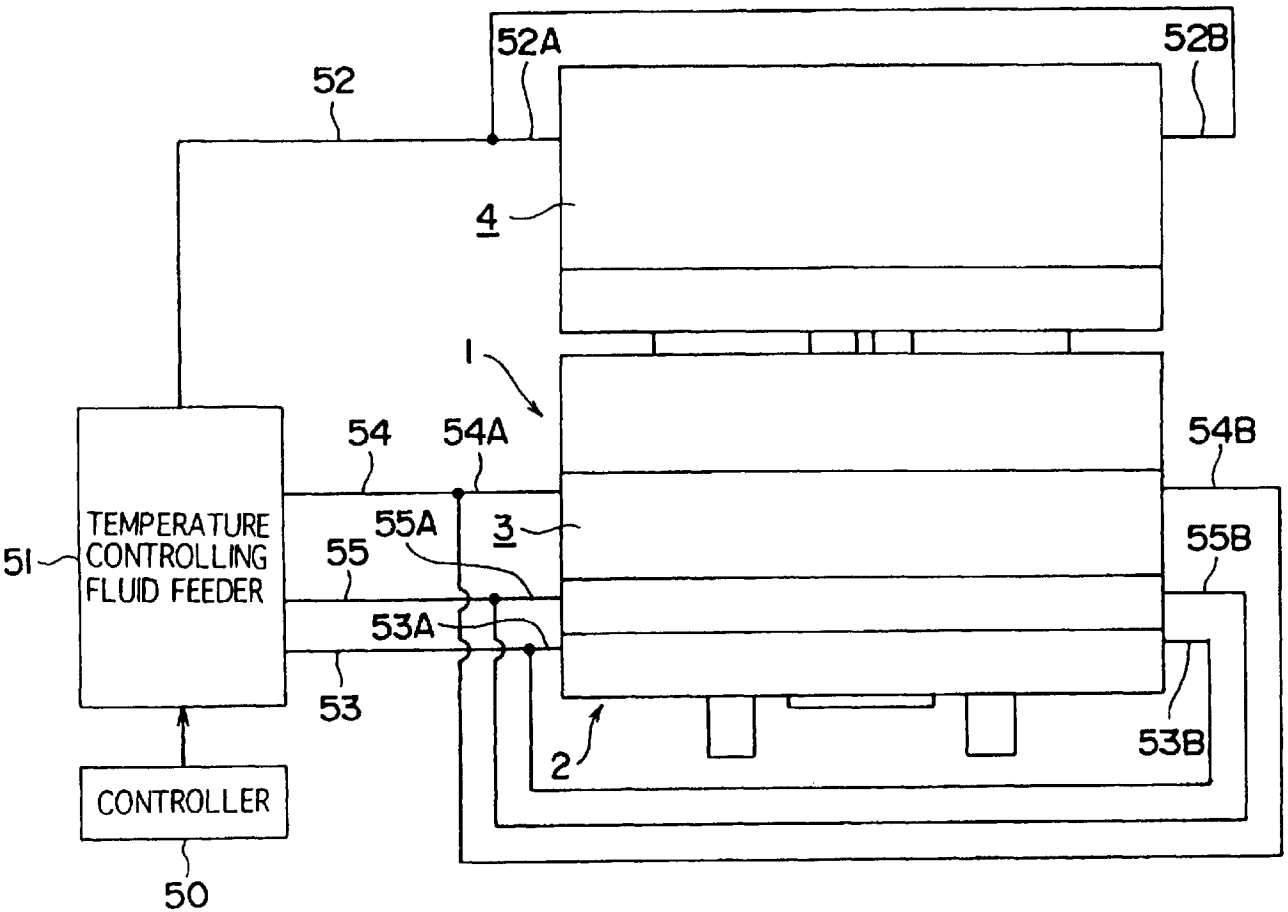
FIG. 4 is a schematic view showing an apparatus for adjusting and controlling the temperature of the molding assembly.

The whole apparatus for adjusting and controlling the temperature of the injection molding assembly is shown in FIG. 4. Main lines 52 to 55 extend from a temperature controlling fluid feeder 51 controlled by a controller 50. End portions of the main lines 52 to 55 lead to branch lines 52A, 52B, 53A, 53B, 54A, 54B, 55A, and 55B.

The branch lines in pair for every main line 52 to 55 are disposed correspondingly to two cavities 22 provided on both sides shown in FIG. 1. In other words, the branch lines 52A and 52B are connected to ring slots 57 formed on upper surfaces of two right and left upper mold inserts 20 through passages 56, the branch lines 53A and 53B are connected to ring slots 59 formed on lower surfaces of two right and left lower mold inserts 21 through passages 58, the branch lines 54A and 54B are connected to peripheral slots 61 formed on side surfaces of two right and left upper mold insert guides 5 through passages 60, and branch lines 55A and 55B are connected to peripheral slots 63 formed on side surfaces of two right and left lower mold insert guides 10 through passages 62.

The temperature controlling fluid feeder 51 shown in FIG. 4 circulates a heating fluid and a cooling fluid through the aforementioned main lines, branch lines, passages, ring slots and peripheral slots so as to raise and lower the temperature of the injection molding assembly, more specifically, temperature around the cavities 22 inside the injection molding assembly. The heating fluid is steam and the cooling fluid is air and water, for example. In the temperature controlling fluid feeder 51 has a switching valve to switch over the heating fluid and the cooling fluid, a closing value to supply and suspend the fluids and the like. The switching valves, the closing valves and the like are controlled by means of signal from the controller 50 which controls the heating and cooling time of the injection molding assembly by the heating fluid and the cooling fluid from the temperature controlling fluid feeder 51. Incidentally, a discharge line, for discharging the heating fluid and the cooling fluid supplied to the injection molding assembly is provided in the injection molding assembly, though not shown in the drawing.

A molding process of a plastic lens for glasses using the injection molding assembly is conducted as follows. The upper mold 1 and the lower mold 2 are closed by the clamping cylinder. When the margin S is open between the mold body 3 of the upper mold 1 and the die fitting member 4 upon operation of the margin setting cylinder and a molten resin is ready to be filled in the cavity 22, the injection molding assembly is heated by supplying the heating fluid from the temperature controlling fluid feeder 51 to raise the temperature of the cavity 22 beyond flow halting temperature of the molten resin. Subsequently, the molten resin is injected from the injection nozzle 41 to be filled in the cavity 22 through the sprue 42 and the runner 43, and the nozzle is shut thereafter.

After the filling or during the filling, the die fitting member 4 is lowered by the clamping cylinder and the molten resin in the cavity 22 is pressurized by the amount corresponding to the margin S by the upper mold insert 20. After the pressurization, the cooling fluid is supplied to the injection molding assembly from the temperature controlling fluid feeder 51. Thus, the temperature of the molten resin in cavity 22 is lowered to, for example, around 100 degrees centigrade below the glass transition point for molding spectacle lens by cooling and solidification of the molten resin.

After the spectacle lens is molded by cooling and solidification of the molten resin in the cavity 22, the upper mold 1 is opened from the lower mold 2 by the clamping cylinder. With the descent of the eject pins 34 and 40, a molded product is pushed out by the upper mold insert 20 and the eject bar 35. Subsequently, the molded product provided with two spectacle lenses ejected from the injection molding assembly as described above is cut to obtain the spectacle lenses molded in the cavities 22.

Figure 5:
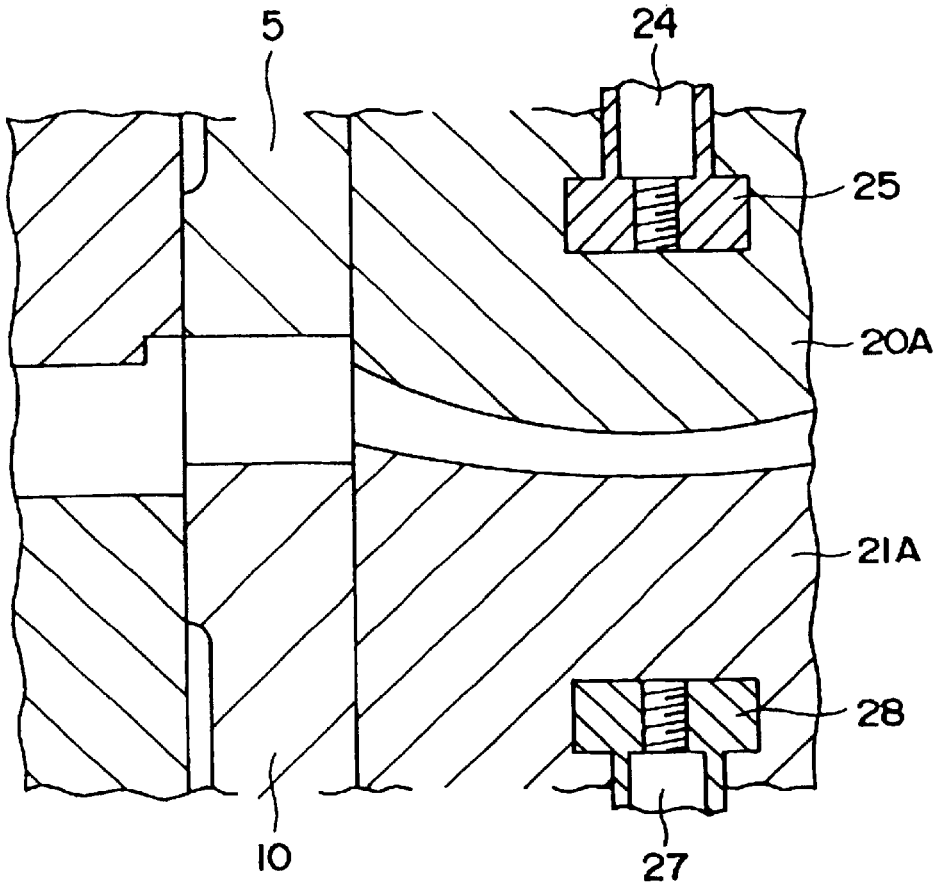
FIG. 5 is a fragmentary enlarged view of FIG. 1 in molding a minus lens having thicker peripheral portion than a central portion.
Figure 6:
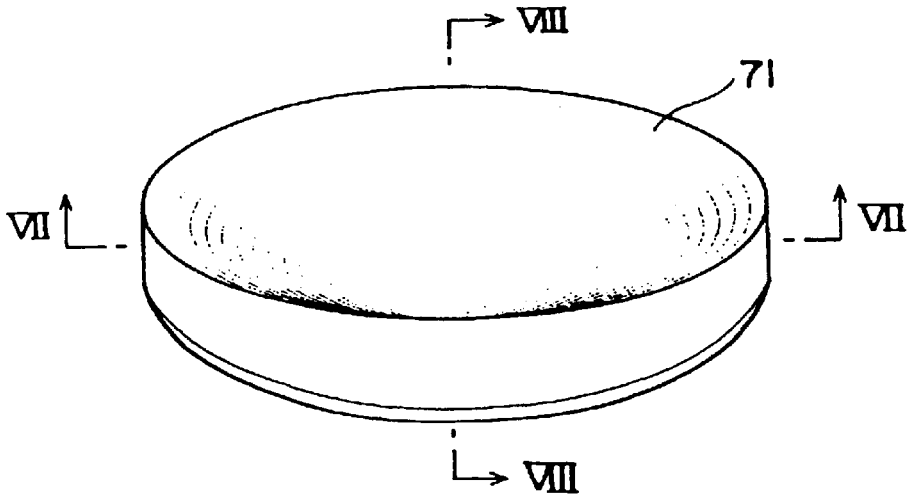
FIG. 6 is a perspective view of a whole minus lens.
Figure 7:
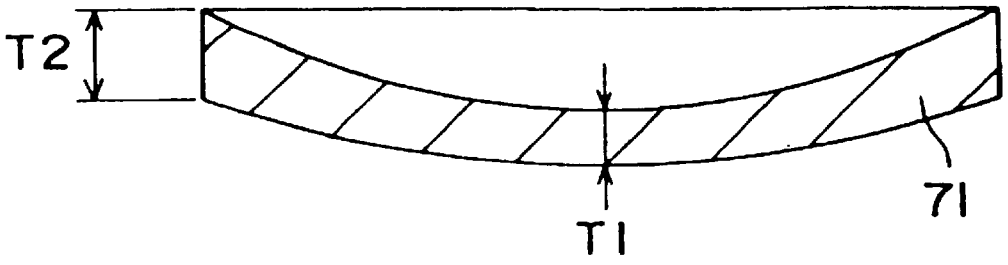
FIG. 7 is a sectional view taken along the VII—VII line in FIG. 6.
Figure 8:
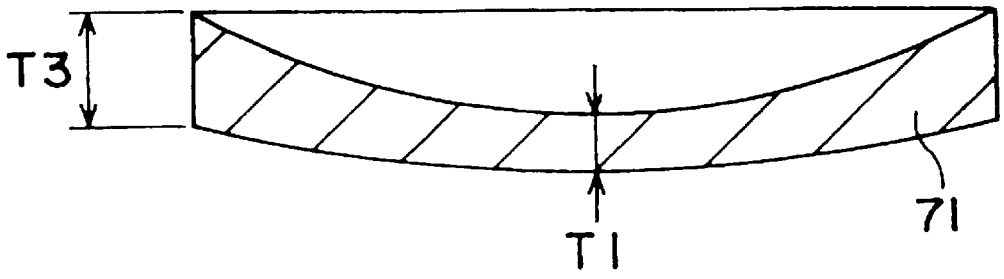
FIG. 8 is a sectional view taken along the VIII—VIII line in FIG. 6.
Figure 9:
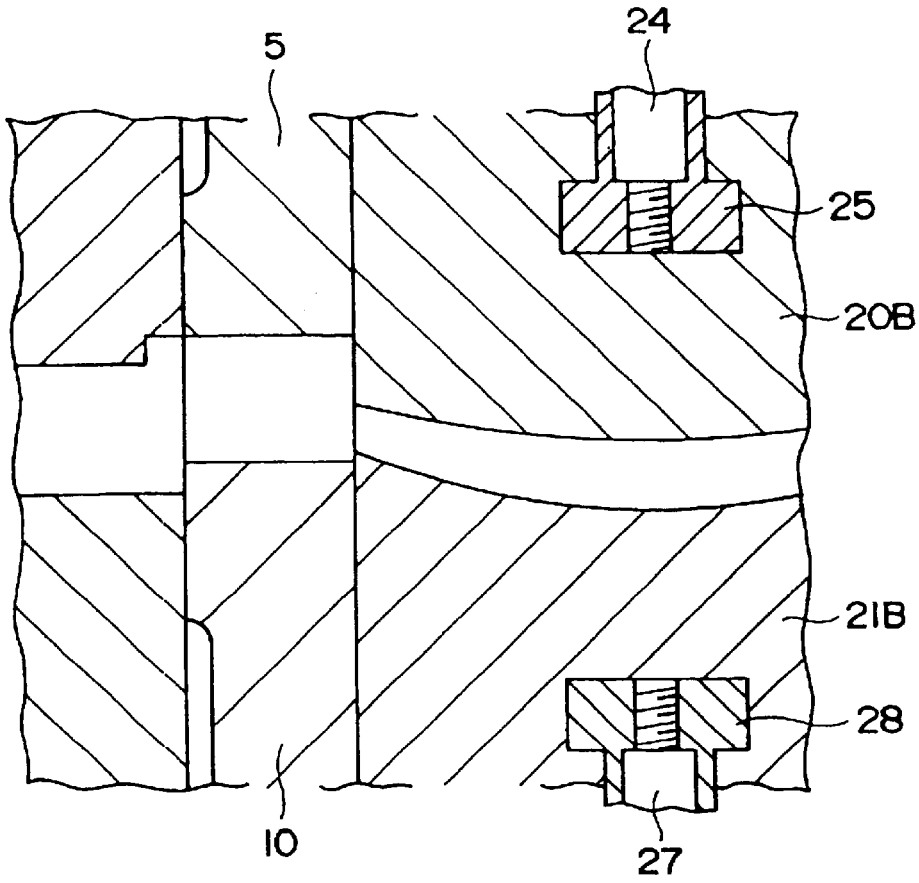
FIG. 9 is a fragmentary enlarged view of FIG. 1 in molding a plus lens having thinner peripheral portion is thinner than a central portion.
Figure 10:
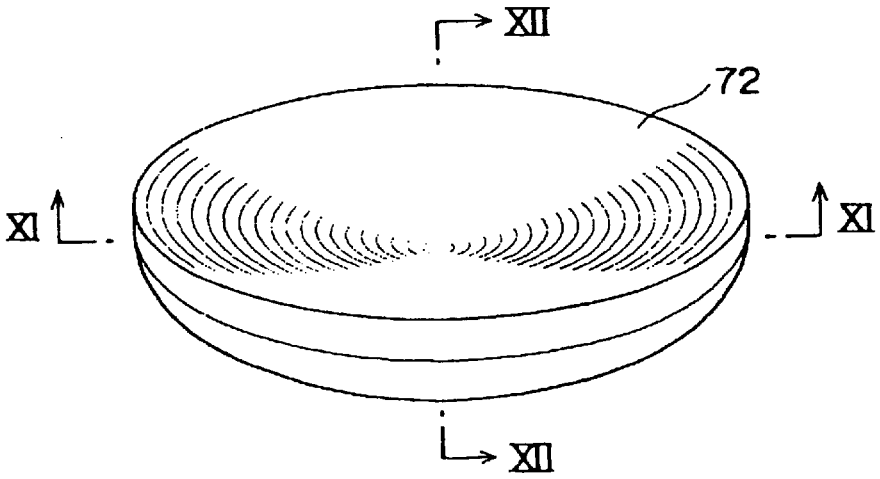
FIG. 10 is a perspective view of a hole plus lens.
Figure 11:
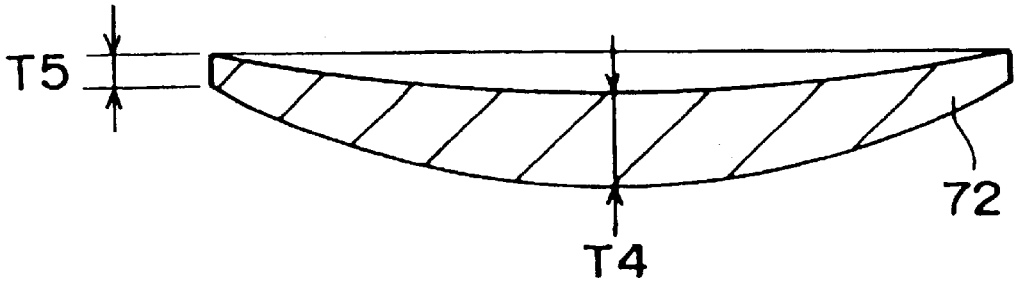
FIG. 11 is a sectional view taken along the XI—XI line in FIG. 10.
Figure 12:
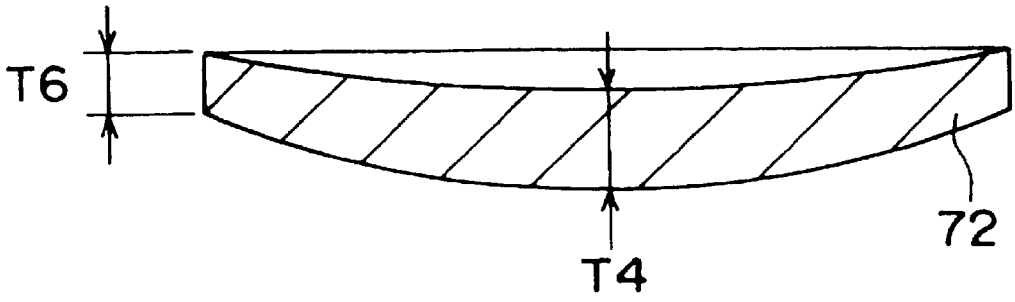
FIG. 12 is a sectional view taken along the XII—XII line in FIG. 10.

The upper mold insert 20 and the lower mold insert 21 are exchangeable as stated above. When molding process is conducted using the upper mold insert 20A and the lower mold insert 21A shown in FIG. 5, a minus lens 71 having larger a thickness T2 of a peripheral portion than a thickness T1 of a central portion is molded as shown in FIGS. 6 and 7. FIG. 8 is a sectional view taken in a direction perpen dicular to FIG. 7. In FIG. 8, a thickness T3 of a peripheral portion is larger than the thickness T2 thus making the minus lens 71 as astigmatic spectacle lens by the difference between T2 and T3. On the other hand, when molding process is conducted using an upper mold insert 20B and a lower mold insert 21B shown in FIG. 9, a plus lens 72 having smaller thickness T5 of peripheral portion than a thickness T4 of a central portion can be molded as shown in FIGS. 10 and 11. FIG. 12 is a sectional view in a right-angled direction perpendicular to FIG. 11. In FIG. 12, a thickness T6 of peripheral portion is larger than T5, thus making the plus lens 72 as astigmatic spectacle lens by the difference between T5 and T6.

Upper mold inserts and lower mold inserts are respectively prepared correspondingly to every lens power (diopter) of minus lenses and plus lenses. Besides, another upper mold insert and a lower mold insert are provided for molding a semi-finished lens, having one surface already finished and the other surface to be later finished.

(A) to (D) in FIG. 13 show temperature curve of upper mold inserts and lower mold inserts in molding various kinds of lenses with a diameter of 76 millimeter from pressurization of the molten resin to ejection of the molded product. FIG. 13(A) to (D) correspond to each lens shape and/or power. FIG. 13(A) shows a case of molding the minus lens (weak minus lens) with a power of −2.00, T1 of 1.4 mm and T2 of 4.8 mm, FIG. 13(B) shows a case of molding a minus lens (strong minus lens) with a power of −4.00, T1 of 1.4 mm and T2 of 7.9 mm, FIG. 13(C) shows a case of molding a plus lens with a power of +2.00, T4 of 4.2 mm and T5 of 1.0 mm, and FIG. 13(D) shows a case of molding a semi-finished lens with a base curve of convex surface of 300 D, a thickness of a central portion of 5.4 mm and a thickness of a peripheral portion of 5.8 mm. These figures are for explaining basic lens molding patterns (basic lens molding patterns of a weak minus lens, a strong minus lens, a semi-finished lens and a plus lens) corresponding to each lens shape and/or power.

Figure 13A:
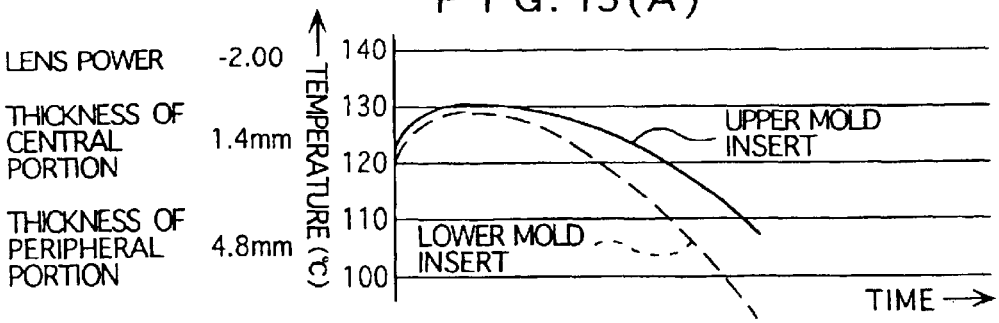
FIGS. 13(A)–13(D) are graphical representation showing changes in temperature of an upper mold insert and a lower mold insert for various kinds of lenses from pressurization of a molten resin to ejection of a molded product.
Figure 13B:
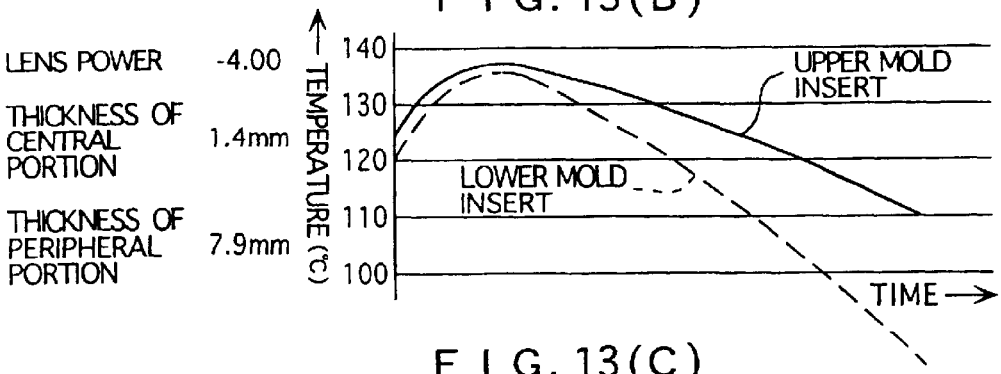
Figure 13C:
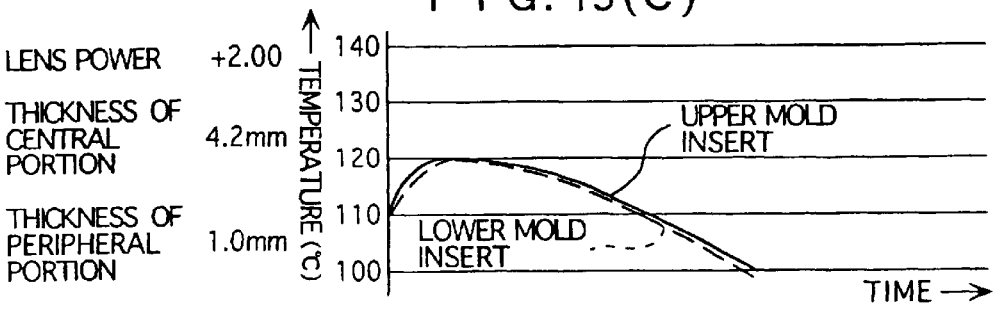
Figure 13D:
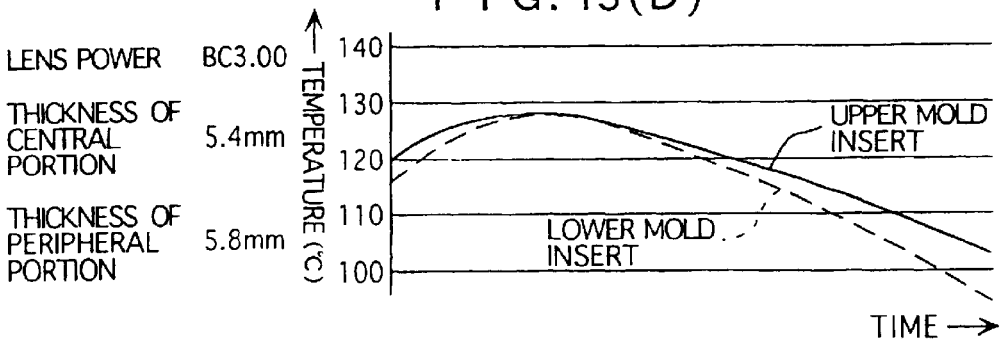

When a minus lens is molded as shown in FIG. 13(A) and (B), the temperature of a lower mold insert (namely, a cavity forming member for shaping a convex surface of the lens) in ejecting a molded product from the injection molding assembly is lowered below the temperature of an upper mold insert (namely, a cavity forming member for shaping a concave surface of the lens). When there is such a difference in temperature as above between the lower mold insert and the upper mold insert according to the difference in lens shape and/or power, since the temperature of the convex surface of the ejected lens is low even in a minus lens of which thin central portion is likely to be bent and the temperature is high when being ejected, the convex side of the lens solidifies earlier than the concave side thereof, thereby efficiently preventing the central portion from being bent. In other words, a concave shape of the lower mold insert and a convex shape of the upper mold insert are precisely transferred to a molten resin so that a high-precision lens can be manufactured.

It is also effective in molding a lens of which a thickness of a central portion is smaller than that of a peripheral portion that the temperature of the lower mold insert is lowered below the temperature of the upper mold insert when the molded product is ejected as described above. Therefore, when a semi-finished lens with a small difference in thickness between a central portion thereof and a peripheral portion thereof shown in (D) in FIG. 13 is molded, the temperature of the lower mold insert is also preferably lowered below that of the upper mold insert as described in molding the minus lens.

As shown in FIG. 13(A), (B), and (D), the larger the difference in thickness between a central portion and a peripheral portion becomes, the more a difference in temperature between the lower mold insert and the upper mold insert is enlarged, which securely prevents various kinds of lenses with various differences in thickness between central portions and peripheral portions from bending at central portions thereof.

As shown in FIG. 13(A), (B), and (D), particularly in FIG. 13(A) and (B), when a lens of which a thickness of a peripheral portion is larger than the thickness of a central portion is molded, the temperature of the lower mold insert is lowered below that of the upper mold insert from pressurization of the molten resin to ejection of a molded product. As a result, the temperature of a convex surface of the lens can be securely lowered below the temperature of a concave surface when the molded product is ejected, thereby improving transfer precision of shapes of the lower mold insert and the upper mold insert.

Following Table 1 shows the cooling time of the injection molding assembly from the start of supplying the aforementioned cooling liquid after pressurizing the molten resin to ejection of a molded product when a minus lens and a plus lens are molded. The cooling time is divided into groups according to lens power (diopter) (spherical power) and astigmatic power. Especially in the minus lens, the grouping is based on the value of the sum of the spherical power and the astigmatic power. The lens spherical power is indicated in a vertical axis and the astigmatic power is indicated in a horizontal axis. A three-digit number in the Table 1 indicates a cooling time (second).

TABLE 1

| | S \ -C | 0.00 | 0.25 | 0.50 | 0.75 | 1.00 | 1.25 | 1.50 | 1.75 | 2.00 |
|---|---|---|---|---|---|---|---|---|---|---|
| PLUS LENS | +6.00 | | | | | | | | | |
| | +5.75 | | | | | | | | | |
| | +5.50 | | | | 280 | | | | | |
| | +5.25 | | | | | | | | | |
| | +5.00 | | | | | | | | | |
| | +4.75 | | | | | | | | | |
| | +4.50 | | | | | | | | | |
| | +4.25 | | | | | | | | | |
| | +4.00 | | | | | | | | | |
| | +3.75 | | | | 220 | | | | | |
| | +3.50 | | | | | | | | | |
| | +3.25 | | | | | | | | | |
| | +3.00 | | | | | | | | | |
| | +2.75 | | | | | | | | | |
| | +2.50 | | | | | | | | | |
| | +2.25 | | | | | | | | | |
| | +2.00 | | 160 | | | | | | | |
| | +1.75 | | | | | | | 180 | | |
| | +1.50 | | | | | | | | | |
| | +1.25 | | | | | | | | | |
| | +1.00 | | | | | | | | | |
| | +0.75 | | | | | | | | | |
| | +0.50 | | 120 | | | | | | | |
| | +0.25 | | | | | | | | | |

TABLE 1-continued

| | | | | | | | | | | |
|---|---|---|---|---|---|---|---|---|---|---|
| MINUS LENS | 0.00 | | | | | | | | | |
| | -0.25 | | | | | | | | | |
| | -0.50 | 120 | | | | | | | | |
| | -0.75 | | | | | | | | | |
| | -1.00 | | | | | 180 | | | | |
| | -1.25 | | | | | | | | | |
| | -1.50 | | | | | | | | | |
| | -1.75 | | | | | | | | | |
| | -2.00 | | | | | | | | | |
| | -2.25 | | | | | | | | | |
| | -2.50 | | | | | 230 | | | | |
| | -2.75 | | | | | | | | | |
| | -3.00 | | | | | | | | | |
| | -3.25 | | | | | | | | | |
| | -3.50 | | | | | | | | | |
| | -3.75 | | | | | | | | | |
| | -4.00 | | | | | | | | | |
| | -4.25 | | | | | 280 | | | | |
| | -4.50 | | | | | | | | | |
| | -4.75 | | | | | | | | | |
| | -5.00 | | | | | | | | | |
| | -5.25 | | | | | | | | | |
| | -5.50 | | | | | | | | | |
| | -5.75 | | | | | | | | | |
| | -6.00 | | | | | | | | | |

As can be seen from FIG. 13(A) and (B), the increase of lens power in a minus lens means that a thickness of the peripheral portion T2 becomes much larger than the thickness of the central portion T1. Also, the increase of lens power in a plus lens means that a thickness of the central portion T4 becomes much larger than that of the peripheral portion T5. As shown in Table 1, the more a lens power increases, the longer a cooling time is made in both the minus lens and the plus lens. When a lens power increases, through surface area of the cavity in the injection molding assembly does not substantially changes, the volume of a lens, that is, the amount of the molten resin filled in the cavity 22 increases. Accordingly, the cooling time is lengthened in proportion to the increase of the lens power, thereby gradually cooling the whole molten resin in the cavity 22 uniformly to a predetermined temperature (the temperature for ejecting the molded product). Consequently, a high-precision and high-quality plastic spectacle lens with little heat distortion, little shrinkage deformation and the like can be obtained.

The cooling time of the injection molding assembly is lengthened in proportion to the increase of the lens power also in molding a semi-finished lens.

As can be seen from a comparison of graphs of FIG. 13(A) and (B), a minus lens with the time from pressurization of molten resin to ejection of the molded product is made longer for minus lens having greater lens power in a minus lens with a smaller power even when the minus lenses have substantially the same surface area in the cavity, thereby lengthening a cooling time of the injection molding assembly. When a lens having larger thickness of a peripheral portion than the thickness of a central portion is molded, the temperature of the lower mold insert is lowered below the temperature of the upper mold insert and a cooling time of the injection molding assembly is lengthened as shown in FIG. 13(A) and (B), which prevents the lens from bending at the central portion so as to enable high insert transfer precision and also prevents heat distortion, thus making a high-quality lens.

As described above, the thickness of peripheral portions T2 and T3 of a minus lens and the thickness of peripheral portions T5 and T6 of a plus lens respectively, show the thickness of two points which are 90 degrees apart in a circumferential direction. The increase of difference between T2 and T3, and between T5 and T6 leads to the increase of astigmatic power. Even in spectacle lenses with the same lens power, the volume of lens becomes larger and more molten resin is filled in the cavity 22 when an astigmatic power is made larger.

In the molding lenses with the same lens power, the larger the astigmatic power becomes, the longer the cooling time is made as shown in Table 1. Accordingly, the whole molten resin filled in the cavity 22 can be uniformly cooled to a predetermined temperature in the same manner as molding glass-lenses with different powers, thus making a high-precision and high-quality spectacle lens.

In the injection molding assembly according to the embodiment described above, the cavity forming member for shaping the lens convex surface is disposed on the lower mold and the cavity forming member for shaping the lens concave surface is disposed on the upper mold, but the reverse disposition is also available. The present invention can be also implemented by means of an injection molding assembly having horizontally-opposed cavity forming members.

According to the aforementioned embodiment, the heating fluid and the cooling fluid are used respectively for heating and cooling the injection molding assembly. However, the present invention is not limited to the above arrangement and preadjusted temperature controlling fluid may be used. Alternatively, a heating method by means of an electric heater and the like and a cooling method by means of forced air-cooling and the like can also be adopted. The cooling time required for cooling to the predetermined temperature is set in accordance with cooling methods.

According to the present invention, the temperature of the cavity forming member for shaping the lens convex surface is lowered below the temperature of the cavity forming member for shaping the lens concave surface, which prevents the molded lens from bending at a central portion. As a result, the shapes of the cavity forming members are highly-precisely transferred to the lens so that a high-precision and high-quality lens as desired can be obtained.

According to the present invention, the cooling time of the injection molding assembly after pressurization of the molten resin is lengthened for a lens with a large power requiring a larger amount of molten resin to be filled in the cavity, so that the entire molten resin can be uniformly cooled to the predetermined temperature. Consequently, a high-precision spectacle lens with little heat distortion and little shrinkage deformation and the like can be manufactured.

INDUSTRIAL AVAILABILITY

A method of injection molding a plastic lens according to the present invention is applicable for molding a plastic lens for glasses, an optical plastic lens etc. made of a thermoplastic resin, and especially useful for molding a meniscus-shaped plastic lens for glasses which require high-precision molding.

What is claimed is:

1. A method of injection molding a plastic lens, comprising the steps of;

providing a cavity for molding the lens including a pair of cavity forming members for shaping a convex surface and a concave surface of the lens disposed oppositely with each other inside an injection molding assembly;

heating the injection molding assembly;

filling a molten resin in the cavity for molding the lens;

pressurizing the molten resin;

cooling the injection molding assembly to cool and solidify the molten resin to mold the lens in the cavity; and ejecting the lens from the cavity, wherein the temperature of the cavity forming member for shaping the convex surface is lowered below the temperature of the cavity forming member for shaping the concave surface *during the cooling of the injection molding assembly*.

2. The method of injection molding the plastic lens according to claim 1, wherein the lens is a meniscus lens having a larger thickness of a peripheral portion than a thickness of a central portion.

3. The method of injection molding the plastic lens according to claim 2, wherein a difference in temperature between the cavity forming member for shaping the convex surface and the cavity forming member for shaping the concave surface is enlarged in proportion to an increase of the power of the lens molded in the cavity.

4. The method of injection molding the plastic lens according to claim 1, wherein the time to cool the injection molding assembly is lengthened in proportion to an increase of the power of the lens molded in the cavity.

5. The method of injection molding the plastic lens according to claim 1, wherein the temperature of the cavity forming member for shaping the convex surface is lowered below the temperature of the cavity forming member for shaping the concave surface from pressurization of the molten resin to ejection of the lens.

6. The method of injection molding the plastic lens according to claim 1, wherein the lens is a spectacle lens, and wherein a cooling time of the spectacle lens with the same power is lengthened in proportion to an increase in the astigmatic power of the spectacle lens.

7. The method of injection molding the plastic lens according to claim 1, wherein the injection molding assembly is heated and cooled by means of a temperature controlling fluid.

8. The method of injection molding the plastic lens according to claim 7, wherein a heating fluid and a cooling fluid are used as the temperature controlling fluid.

9. The method of injection molding the plastic lens according to claim 1, wherein the lens is a spectacle lens and wherein the injection molding assembly has at least two temperature curves relating to molding a weak lens and a strong lens for minus lenses and at least one temperature curves for a plus lens, the temperature of the injection molding assembly being controlled in accordance with the temperature curves.

10. The method of injection molding the plastic lens according to claim 9, wherein another different temperature curve is prepared for a semi-finished lens of which one side is later molded, the semi-finished lens being molded by controlling temperature of the injection molding assembly in accordance with the different temperature curve.

11. The method of injection molding the plastic lens according to claim 9, wherein the time to cool the injection molding assembly after pressurization the molten resin is set by being grouped according to lens spherical power and lens astigmatic power when a minus lens and a plus lens are molded.

12. The method of injection molding the plastic lens according to claim 11, wherein the time to cool the injection molding assembly after pressurizing the molten resin is set by being grouped on the basis of the sum of lens spherical power and lens astigmatic power in molding the minus lens.

*13. A method of injection molding a plastic lens comprising:*

*molding the lens from a molten resin in a cavity formed by a pair of cavity forming members for shaping the lens inside a heated injection molding assembly;*

*cooling the injection molding assembly to cool and solidify the molten resin to mold the lens in the cavity; and*

*ejecting the lens from the cavity,*

*wherein bending of the lens at a thinner portion of the lens during manufacture of the lens is substantially prevented by at least one of controlling a temperature of a first of the pair of cavity forming members to be below a temperature of a second of the pair of cavity forming members during the cooling of the injection molding assembly, and controlling a cooling time of the injection molding assembly to be longer in proportion to an increase in the power of the lens molded in the cavity.*

*14. The method according to claim 13, wherein said first cavity forming member is for shaping a convex surface of the lens and said second cavity forming member is for shaping a concave surface of the lens.*

*15. The method according to claim 13, wherein said molding comprises:*

*heating the injection molding assembly;*

*filling a molten resin in the cavity for molding the lens; and*

*pressurizing the molten resin.*

*16. The method according to claim 13, wherein said bending is substantially prevented by controlling a temperature of a first of the pair of cavity forming members to be below a temperature of a second of the pair of cavity forming members.*

*17. The method according to claim 14, wherein said bending is substantially prevented by controlling a temperature of said first cavity forming member to be below a temperature of said second cavity forming member.*

*18. The method according to claim 13, wherein said bending is substantially prevented by controlling a cooling time of the injection molding assembly to be longer in proportion to an increase in the power of the lens molded in the cavity.*

*19. The method according to claim 18, wherein the lens is a spectacle lens, and wherein a cooling time of the spectacle lens with the same power is longer in proportion to an increase in the astigmatic power of the spectacle lens.*

*20. The method according to claim 18, wherein the lens is a spectacle lens and wherein the injection molding assembly has at least two temperature curves relating to molding a weak lens and a strong lens for minus lenses and at least one temperature curve for a plus lens, the temperature of the injection molding assembly being controlled in accordance with the temperature curves.*

*21. The method according to claim 20, wherein another different temperature curve is prepared for a semi-finished lens of which one side is later molded, the semi-finished lens being molded by controlling temperature of the injection molding assembly in accordance with the different temperature curve.*

*22. The method according to claim 20, wherein the time to cool the injection molding assembly after pressurizing the molten resin is set by being grouped according to lens spherical power and lens astigmatic power when a minus lens and a plus lens are molded.*

*23. The method according to claim 22, wherein the time to cool the injection molding assembly after pressurizing the molten resin is set by being grouped on the basis of the sum of lens spherical power and lens astigmatic power in molding the minus lens.*

*24. The method according to claim 13, wherein said cooling is conducted in accordance with at least one temperature curve so as to cool and solidify the molten resin to mold the lens in the cavity.*

*25. The method according to claim 13, wherein the lens is a minus lens having a thickness at a central portion of the lens that is less than a thickness at a peripheral portion of the lens.*

*26. A method of injection molding a plastic lens comprising the steps of:*

*filling a molten resin in a cavity formed by a pair of cavity forming members for shaping a convex surface and a concave surface of the lens inside a heated injection molding assembly;*

*pressurizing the molten resin;*

*cooling the injection molding assembly to cool and solidify the molten resin to mold the lens in the cavity; and*

*ejecting the lens from the cavity,*

*wherein said cooling comprises at least one of (i) controlling a cooling time of the injection molding assembly to be longer in proportion to an increase in the power of the lens molded in the cavity, and (ii) controlling a temperature of the cavity forming member for shaping the convex surface to be lower than a temperature of the cavity forming member for shaping the concave surface, during the cooling of the injection molding assembly.*

*27. The method according to claim 26, wherein said cooling comprises controlling a temperature of the cavity forming member for shaping the convex surface to be lower than a temperature of the cavity forming member for shaping the concave surface.*

*28. The method according to claim 26, wherein said cooling comprises controlling a cooling time of the injection molding assembly to be longer in proportion to an increase in the power of the lens molded in the cavity.*

*29. The method according to claim 28, wherein the lens is a spectacle lens, and wherein a cooling time of the spectacle lens with the same power is longer in proportion to an increase in the astigmatic power of the spectacle lens.*

*30. The method according to claim 28, wherein the lens is a spectacle lens and wherein the injection molding assembly has at least two temperature curves relating to molding a weak lens and a strong lens for minus lenses and at least one temperature curve for a plus lens, the temperature of the injection molding assembly being controlled in accordance with the temperature curves.*

*31. The method according to claim 30, wherein another different temperature curve is prepared for a semi-finished lens of which one side is later molded, the semi-finished lens being molded by controlling temperature of the injection molding assembly in accordance with the different temperature curve.*

*32. The method according to claim 30, wherein the time to cool the injection molding assembly after pressurizing the molten resin is set by being grouped according to lens spherical power and lens astigmatic power when a minus lens and a plus lens are molded.*

*33. The method according to claim 32, wherein the time to cool the injection molding assembly after pressurizing the molten resin is set by being grouped on the basis of the sum of lens spherical power and lens astigmatic power in molding the minus lens.*

*34. The method according to claim 26, wherein said cooling is conducted in accordance with at least one temperature curve so as to cool and solidify the molten resin to mold the lens in the cavity.*

*35. The method according to claim 26, wherein the lens is a minus lens having a thickness at a central portion of the lens that is less than a thickness at a peripheral portion of the lens.*

*36. A method of injection molding a plastic lens comprising the steps of:*

*filling a molten resin in a cavity formed by a pair of cavity forming members for shaping a convex surface and a concave surface of the lens inside a heated injection molding assembly;*

*pressurizing the molten resin;*

*cooling the injection molding assembly to cool and solidify the molten resin to mold the lens in the cavity; and*

*ejecting the lens from the cavity,*

*wherein at least one of the following conditions is satisfied:*

*(i) said cooling comprises controlling a temperature of the cavity forming member for shaping the convex surface to be lower than a temperature of the cavity forming member for shaping the concave surface, during the cooling of the injection molding assembly, and*

*(ii) the lens is a spectacle lens and the injection molding assembly has at least two temperature curves relating to molding a weak lens and a strong lens for minus lenses and at least one temperature curve for a plus lens, and wherein the temperature of the injection molding assembly is controlled in accordance with the temperature curves.*

*37. The method according to claim 26, wherein said cooling comprises controlling a cooling time of the injection molding assembly to be longer in proportion to an increase in a sum of the spherical power and the astigmatic power of the lens molded in the cavity.*

* * * * *